A. C. SLOAN.
TROLLEY WHEEL.
APPLICATION FILED MAR. 6, 1911.
1,006,303.
Patented Oct. 17, 1911.
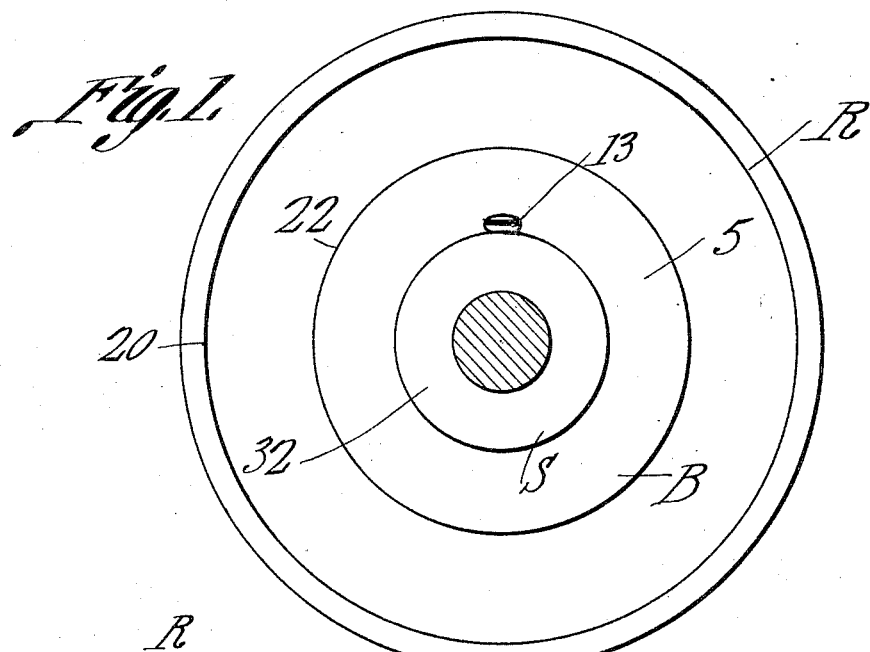
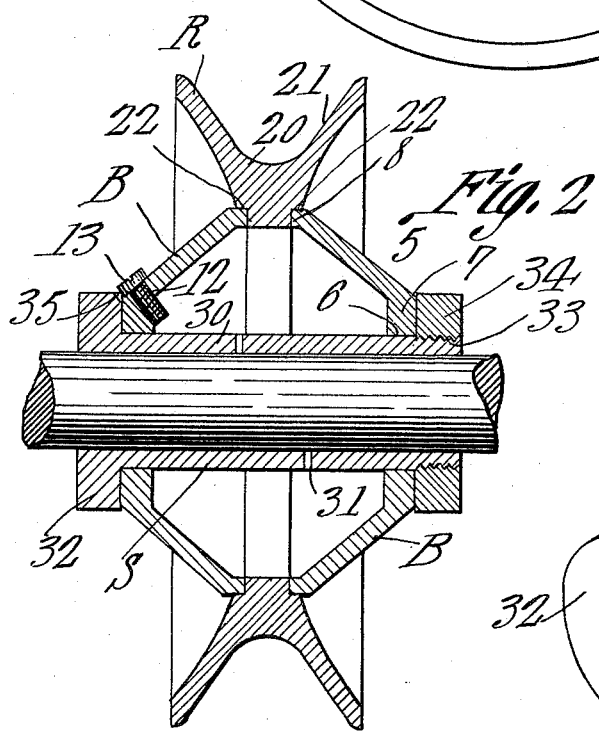
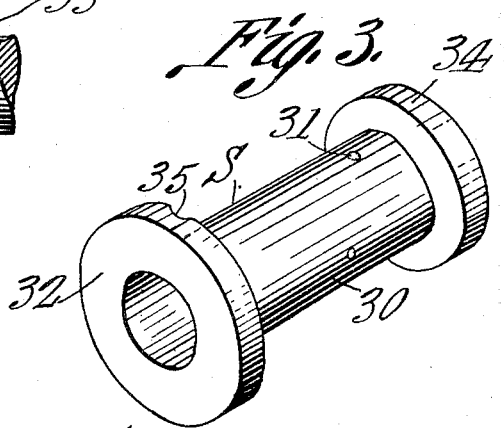
Witnesses
Inventor
A. C. Sloan
by
Attorneys

UNITED STATES PATENT OFFICE.

ALBERT C. SLOAN, OF SALAMANCA, NEW YORK.

TROLLEY-WHEEL.

1,006,303.  Specification of Letters Patent.  Patented Oct. 17, 1911.

Application filed March 6, 1911. Serial No. 612,598.

*To all whom it may concern:*

Be it known that I, ALBERT C. SLOAN, a citizen of the United States, residing at Salamanca, in the county of Cattaraugus and State of New York, have invented a new and useful Trolley-Wheel, of which the following is a specification.

This invention relates to pulleys, and more especially to that kind which are constructed and adapted and intended to lubricate the axle upon which they rotate; and the object of the same is to produce a trolley wheel having a hollow body to contain the lubricant, means for introducing the lubricant thereinto when necessary, and its parts all made separable so that they can be disassociated when it is desired to replace a worn rim with a new one.

These objects are accomplished by the construction hereinafter described and claimed, and as shown in the drawings wherein—

Figure 1 is an end elevation of this trolley wheel complete. Fig. 2 is a central vertical section therethrough. Fig. 3 is a perspective detail of the two parts of the sleeve which extends through the axis of this wheel and which is journaled on the rod or shaft.

In the drawings, the letter S designates as an entirety a sleeve which is fixed through the center of this trolley wheel and by means of which it is journaled upon its support, such as a shaft or rod, the letter B designates the body of this wheel made in two hollow truncated cones, and the letter R designates its rim which is detachably clamped between the inner ends of said body members so that it may be removed when it becomes worn and replaced with another. These several members are described in full here below.

The body members B are duplicates of each other, and a description of one will suffice for both. It consists of a thin light shell of metal formed in the shape of a hollow truncated cone 5 with its smaller end turned inward toward the axis in a hub 7 pierced with a hole 6, and its larger end preferably formed with an axially projecting flange 8. Through one member is formed a filling orifice 12 closed by a screw plug 13.

The rim R is simply an annulus or band 20 with its outer face dished as at 21 so as to receive the trolley wire and its inner face formed with side grooves 22 to receive the flanges 8.

The sleeve S is a tubular member 30 having a series of holes 31 throughout its length, a rigid enlarged head 32 at one end, and its other end threaded as at 33; and on the latter screws a nut 34 which is of about the same size and shape as the head 32, this head being provided with a notch 35 at a proper point to permit the head of the screw plug 13 to pass therein when the said plug is put in place to hold the relative parts in fixed position as well as forming a closure within the shell. In order to accomplish a close connection of parts the exterior diameter of the sleeve will be such as to fit closely within the holes 6 through the hubs 7 of the bodies B, and the length of the same will be such that when in place it extends throughout the axial length of the body so that the head 32 engages against one hub 7 and the nut 34 can be screwed up against the other hub. The body members 5 are thereby forced toward each other so that their axial flanges 8 are pressed into the grooves 22 in the rim R, and thus the tightening of the nut 34 secures the various parts of this trolley wheel in position.

I have found that the long and heavy usage to which trolley wheels are subjected, as well as rapid rotation in all kinds of weather, greatly reduces their life; and as the wear comes principally upon the rim where it contacts with the trolley wire, this usually wears out first and must be replaced from time to time. This construction of trolley wheel permits its parts to be disassembled at times and a worn rim to be replaced in a manner which will be clear. Another point of extreme wear is where the wheel rotates about the shaft or rod which extends through it, and this construction of hollow body provides a reservoir for oil, capable of being filled from time to time through the orifice 12, and which—because it rotates—is normally driven outward or away from the sleeve and shaft but which—at times when the trolley is idle—will settle in the lower half of the body and normally pass upward through whichever of the holes 31 is at the bottom of the sleeve at that time, thereby directly applying the lubricant to the shaft around which the sleeve is to rotate. This sleeve will of course be of some hard material to withstand wear, but the rim which needs replacing often may be of some cheaper material, and the whole wheel being hollow is light of weight and cheap to make.

What is claimed as new is:—

1. A trolley wheel comprising a hollow body consisting of two hollow truncated cones having inwardly projecting hubs around their smaller ends and axially projecting flanges around their larger ends, and one of the truncated cones having a filling orifice; a rim having grooves in its side faces to receive said axial flanges; a sleeve consisting of a tubular member having radial holes through it, an enlarged integral head at one end thereof and external threads on its other end, a nut screwed upon the latter end, said nut and head adapted to contact with the hubs of the body members; and a screw plug engageable in said filling orifice and adapted to hold the said sleeve and truncated cones in position.

2. A trolley wheel comprising a hollow body consisting of two hollow truncated cones having hubs at their smaller ends and flanges at their larger ends, and one of said truncated cones having a filling orifice which is screw threaded; a rim having grooves in its side faces to receive said flanges at the larger ends of the truncated cones; and a sleeve consisting of a tubular member having radial holes through it and an enlarged integral head at one end thereof, said head having a notch therein, and external threads on its other end, and a nut screwed upon the latter end, said nut and head adapted to contact with the hubs of the body members; and a screw plug engaged in the said filling orifice and having its head fitting in the notch in the head of the tubular member to secure the parts in position.

In testimony that I claim the foregoing as my own, I have hereto affixed my signature in the presence of two witnesses.

ALBERT C. SLOAN.

Witnesses:
WESLEY C. BAUTON,
CHARLES E. CONGDON.

---

Copies of this patent may be obtained for five cents each, by addressing the "Commissioner of Patents, Washington, D. C."